US012067938B2

(12) United States Patent
Zeng et al.

(10) Patent No.: US 12,067,938 B2
(45) Date of Patent: Aug. 20, 2024

(54) PIXEL CIRCUIT AND DISPLAY DEVICE AND METHOD OF DRIVING SAME

(71) Applicant: WUHAN CHINA STAR OPTOELECTRONICS SEMICONDUCTOR DISPLAY TECHNOLOGY CO., LTD., Hubei (CN)

(72) Inventors: Mian Zeng, Hubei (CN); Liang Sun, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/622,785

(22) PCT Filed: Dec. 17, 2021

(86) PCT No.: PCT/CN2021/139163

§ 371 (c)(1),
(2) Date: Dec. 24, 2021

(87) PCT Pub. No.: WO2023/108612

PCT Pub. Date: Jun. 22, 2023

(65) Prior Publication Data

US 2024/0038161 A1 Feb. 1, 2024

(30) Foreign Application Priority Data

Dec. 13, 2021 (CN) ......................... 202111521929.5

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
CPC ... G09G 2300/0861; G09G 2340/0435; G09G 3/3233
See application file for complete search history.

(56) References Cited

U.S. PATENT DOCUMENTS 11,211,011 B2 * 12/2021 Kim .................... H10K 59/131
2019/0164491 A1 5/2019 Kim et al.
(Continued)

FOREIGN PATENT DOCUMENTS

CN 102346999 A 2/2012
CN 108288457 A 7/2018
(Continued)

OTHER PUBLICATIONS

International Search Report in International application No. PCT/CN2021/139163,mailed on Aug. 29, 2022.
(Continued)

*Primary Examiner* — Koosha Sharifi-Tafreshi
(74) *Attorney, Agent, or Firm* — PV IP PC; Wei Te Chung; Zhigang Ma

(57) ABSTRACT

A pixel circuit, a display device, and a method of driving the same are provided. The pixel circuit includes a light emitting element, a first transistor, and a second transistor. In response to a time voltage signal provided by a time voltage line RST, the second transistor T2 is turned off during a display scan period of one frame period and is turned on during a self scan period of one frame period to reset the first transistor T1 during the self scan period of one frame period.

10 Claims, 7 Drawing Sheets

(52) U.S. Cl.
CPC . *G09G 2300/0861* (2013.01); *G09G 2310/08* (2013.01); *G09G 2330/021* (2013.01)

(56) References Cited

U.S. PATENT DOCUMENTS

| | | | | |
|---|---|---|---|---|
| 2021/0366397 A1* | 11/2021 | Na | G09G 3/3258 | |
| 2023/0145644 A1* | 5/2023 | Shin | G09G 3/3233 345/212 | |

FOREIGN PATENT DOCUMENTS

| | | | |
|---|---|---|---|
| CN | 111613180 | A | 9/2020 |
| CN | 112102785 | A | 12/2020 |
| CN | 112116897 | A | 12/2020 |
| CN | 112133242 | A | 12/2020 |
| CN | 112634832 | A | 4/2021 |
| CN | 112785956 | A | 5/2021 |
| CN | 112802431 | A | 5/2021 |
| CN | 113012643 | A | 6/2021 |
| CN | 113140179 | A | 7/2021 |
| CN | 113450717 | A | 9/2021 |
| CN | 113707064 | A | 11/2021 |
| CN | 113707076 | A | 11/2021 |
| CN | 113763888 | A | 12/2021 |

OTHER PUBLICATIONS

Written Opinion of the International Search Authority in International application No. PCT/CN2021/139163, mailed on Aug. 29, 2022.

Chinese Office Action issued in corresponding Chinese Patent Application No. 202111521929.5 dated Mar. 16, 2023, pp. 1-10.

Chinese Office Action issued in corresponding Chinese Patent Application No. 202111521929.5 dated Jun. 8, 2023, pp. 1-8.

* cited by examiner

PIXEL CIRCUIT AND DISPLAY DEVICE AND METHOD OF DRIVING SAME

FIELD

The present disclosure relates to display technologies, and more particularly, to a pixel circuit, a display device, and a method of driving the same.

BACKGROUND

A display device may include a pixel circuit. Each pixel circuit may include a transistor, a light emitting element electrically connected to the transistor, and a capacitor. The transistor may be turned on in response to a corresponding signal provided through the wire, and a predetermined driving current may be generated by the turned-on transistor. The light emitting element can emit light in response to the driving current.

Recently, a method of driving the display device at a low frequency is developed to improve driving efficiency of the display device and minimize power consumption of the display device.

SUMMARY

In view of the above, the present disclosure provides a pixel circuit, a display device and a method of driving the same to reset and compensate the pixel circuit in case of low-frequency driving, to improve driving efficiency of the display device, and to minimize power consumption of the display device.

In order to achieve above-mentioned object of the present disclosure, one embodiment of the disclosure provides a pixel circuit, including:

a light emitting element;

a first transistor connected to the light emitting element in series, wherein the first transistor and the light emitting element are disposed between a first power and a second power, and the first transistor is configured to control a driving current pass through the light emitting element base on a voltage of a gate of the first transistor; and a second transistor connected to the first transistor, wherein the second transistor is cutoff in a display scan period of a frame period and turning on in a self scan period of the frame period to reset the first transistor in the self scan period of the frame period base on a time voltage signal provided from a time voltage line.

In one embodiment of the pixel circuit, a gate of the second transistor is electrically connected to the time voltage line, a source of the second transistor is electrically connected to a reset power, a drain of the second transistor is electrically connected to a source of the first transistor or a drain of the first transistor.

In one embodiment of the pixel circuit, the pixel circuit includes:

a third transistor, wherein a gate of the third transistor is electrically connected to a first scan line, a source of the third transistor is electrically connected to the source of the first transistor, and a drain of the third transistor is electrically connected to the gate of the first transistor; and a fourth transistor, wherein a gate of the fourth transistor is electrically connected to a second scan line, a source of the fourth transistor is electrically connected to a first initial power, and a drain of the fourth transistor is electrically connected to the drain of the first transistor.

In one embodiment of the pixel circuit, the pixel circuit further includes:

a fifth transistor, wherein a gate of the fifth transistor is electrically connected to a third scan line, a source of the fifth transistor is electrically connected to a data line, and a drain of the fifth transistor is electrically connected to the source of the first transistor;

a sixth transistor, wherein a gate of the sixth transistor is electrically connected to the third scan line, a source of the sixth transistor is electrically connected to a second initial power, and a drain of the sixth transistor is electrically connected to an anode of the light emitting element, and wherein a cathode of the light emitting element is electrically connected to the second power;

a seventh transistor, wherein a gate of the seventh transistor is electrically connected to an emitting control line, a source of the seventh transistor is electrically connected to the first power, and a drain of the seventh transistor is electrically connected to the source of the first transistor;

an eighth transistor, wherein a gate of the eighth transistor is electrically connected to the emitting control line, a source of the eighth is electrically connected to the drain of the first transistor, and a drain of the eighth transistor is electrically connected to the anode of the light emitting element; and a capacitor, wherein one end of the capacitor is electrically connected to the first power, and another end of the capacitor is electrically to the gate of the first transistor.

In one embodiment of the pixel circuit, the first scan line, the second scan line, and the third scan line are configured to provide scan signal in the display scan period to turn on transistors correspondingly and configured to provide no scan signal in the self scan period.

In one embodiment of the pixel circuit, a frequency of a first scan signal provided by the first scan line, a frequency of a second scan signal provided by the second scan line, and a frequency of a third scan signal provided by the third scan line are the same.

In one embodiment of the pixel circuit, the pixel circuit further includes a ninth transistor, a gate of the ninth transistor is electrically connected to the time voltage line, a source of the ninth transistor is electrically connected to the second initial power, and a drain of the ninth transistor is electrically connected to the anode of the light emitting element.

In one embodiment of the pixel circuit, the first transistor, the second transistor, the third transistor, the fourth transistor, the fifth transistor, the sixth transistor, the seventh transistor, the eighth transistor, and the ninth transistor all are low temperature poly silicon transistor.

Another embodiment of the disclosure further provides a display device, including a pixel circuit, wherein the pixel circuit includes a first transistor, a second transistor, a third transistor, a fourth transistor, a fifth transistor, a sixth transistor, a seventh transistor, a eighth transistor, a capacitor, and a light emitting element, the first transistor is connected to the light emitting element in series, the first transistor and the light emitting element are disposed between a first power and a second power, a gate of the second transistor is electrically connected to a time voltage line, a source of the second transistor is electrically connected to a reset power, a drain of the second transistor is electrically connected to a source of the first transistor or a drain of the first transistor, a gate of the third transistor is electrically connected to a first scan line, a source of the third transistor is electrically connected to the source of the first transistor, a drain of the third transistor is electrically connected to the gate of the first transistor, a gate of the fourth transistor is electrically connected to a second scan line, a source of the fourth transistor is electrically connected to a first initial power, a drain of the fourth transistor is electrically connected to the drain of the first transistor. a gate of the fifth transistor is electrically connected to a third scan line, a source of the fifth transistor is electrically connected to a data line, a drain of the fifth transistor is electrically connected to the source of the first transistor, a gate of the sixth transistor is electrically connected to the third scan line, a source of the sixth transistor is electrically connected to a second initial power, a drain of the sixth transistor is electrically connected to an anode of the light emitting element, a cathode of the light emitting element is electrically connected to the second power, a gate of the seventh transistor is electrically connected to an emitting control line, a source of the seventh transistor is electrically connected to the first power, a drain of the seventh transistor is electrically connected to the source of the first transistor, a gate of the eighth transistor is electrically connected to the emitting control line, a source of the eighth is electrically connected to the drain of the first transistor, a drain of the eighth transistor is electrically connected to the anode of the light emitting element, one end of the capacitor is electrically connected to the first power, and another end of the capacitor is electrically to the gate of the first transistor.

In one embodiment of the display device, the first scan line, the second scan line, and the third scan line are configured to provide scan signal in a display scan period to turn on transistors correspondingly and configured to provide no scan signal in a self scan period.

In one embodiment of the display device, a frequency of a first scan signal provided by the first scan line, a frequency of a second scan signal provided by the second scan line, and a frequency of a third scan signal provided by the third scan line are the same.

In one embodiment of the display device, the pixel circuit further includes a ninth transistor, a gate of the ninth transistor is electrically connected to the time voltage line, a source of the ninth transistor is electrically connected to the second initial power, and a drain of the ninth transistor is electrically connected to the anode of the light emitting element.

In one embodiment of the display device, the first transistor, the second transistor, the third transistor, the fourth transistor, the fifth transistor, the sixth transistor, the seventh transistor, the eighth transistor, and the ninth transistor all are transistors with a same type.

In one embodiment of the display device, the first transistor, the second transistor, the third transistor, the fourth transistor, the fifth transistor, the sixth transistor, the seventh transistor, the eighth transistor, and the ninth transistor all are low temperature polysilicon transistor.

Another embodiment of the disclosure further provides a method of driving a display device, wherein the method of driving the display device is configured to drive the display device of claim 9, and the method includes:

simultaneously controlling the second transistor, the fifth transistor, the sixth transistor, the seventh transistor, and the eighth transistor to cut off and controlling the third transistor and the fourth transistor to turn on, wherein the first initial power provides a first initial signal to the gate of the first transistor;

simultaneously controlling the second transistor, the fourth transistor, the seventh transistor, and the eighth transistor to cut off and controlling the third transistor, the fifth transistor, and the sixth transistor to turn on, wherein the second initial power provides a second initial signal to the anode of the light emitting element, and the data line provides a data signal to the source of the first transistor;

simultaneously controlling the second transistor, the third transistor, the fourth transistor, the fifth transistor, and the sixth transistor to cut off and controlling the seventh transistor and the eighth transistor to turn on to let the light emitting element to emit light;

simultaneously controlling the third transistor, the fourth transistor, the fifth transistor, the sixth transistor, the seventh transistor, and the eighth transistor to cut off; and controlling the second transistor to turn on to reset the first transistor.

In comparison with prior art, the disclosure provides the pixel, the display device, and the method of driving the same include the second transistor cutoff in a display scan period of a frame period and turning on in a self scan period of the frame period to reset the first transistor in the self scan period of the frame period base on a time voltage signal provided from a time voltage line to reset and compensate the pixel circuit in case of low-frequency driving, to improve driving efficiency of the display device, and to minimize power consumption of the display device

DETAILED DESCRIPTION

Figure 1:
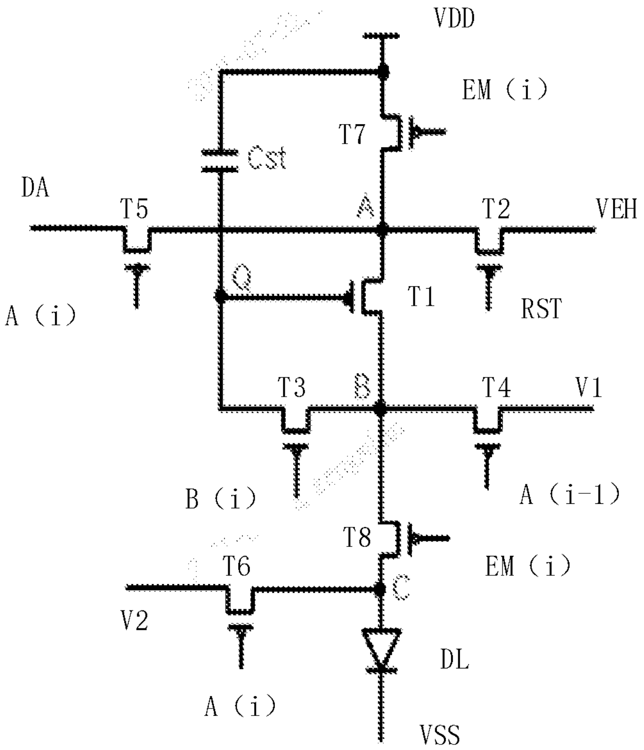
FIG. 1 is a first equivalent circuit diagram of a pixel circuit of an embodiment of the present disclosure.

The specific structure and functional details disclosed herein are only representative and are used for the purpose of describing exemplary embodiments of the present application. However, this application can be implemented in many alternative forms, and should not be interpreted as being limited only to the embodiments set forth herein.

In the description of this application, it should be understood that the terms “center”, “lateral”, “upper”, “lower”, “left”, “right”, “vertical”, “horizontal”, “top”, The orientation or positional relationship indicated by “bottom”, “inner”, “outer”, etc. is based on the orientation or positional relationship shown in the drawings, and is only for the convenience of describing the application and simplifying the description, and does not indicate or imply the pointed device Or the element must have a specific orientation, be constructed and operated in a specific orientation, and therefore cannot be understood as a limitation of the present application. In addition, the terms "first" and "second" are only used for descriptive purposes and cannot be understood as indicating or implying relative importance or implicitly indicating the number of indicated technical features. Therefore, the features defined with "first" and "second" may explicitly or implicitly include one or more of these features. In the description of this application, unless otherwise specified, "plurality" means two or more. In addition, the term "including" and any variations thereof is intended to cover non-exclusive inclusion.

It should be noted that, because the source and drain of the transistor used in this application are symmetrical, the source and drain can be interchanged. In the embodiments of the present application, in order to distinguish the two electrodes of the transistor other than the gate, one of the electrodes is called the source and the other is called the drain. According to the form in the figure, it is stipulated that the middle end of the transistor is the gate, the signal input end is the source, and the output end is the drain.

Please refer to FIG. 1. FIG. 1 is a first equivalent circuit diagram of a pixel circuit provided by an embodiment of the application. In FIG. 1, for ease of description, a pixel circuit located or arranged on the i-th horizontal row (where "i" is a natural number) and electrically connected to the j-th data line DA (where "j" is a natural number) is shown.

As shown in FIG. 1, the pixel circuit includes a first transistor T1, a second transistor T2, a third transistor T3, a fourth transistor T4, a fifth transistor T5, a sixth transistor T6, a seventh transistor T7, an eighth transistor T8, a capacitor Cst, and light-emitting element DL.

In the embodiment of the present application, the first transistor T1, the second transistor T2, the third transistor T3, the fourth transistor T4, the fifth transistor T5, the sixth transistor T6, the seventh transistor T7, and the eighth transistor T8 may all be low temperature polysilicon thin film transistors. In the embodiments of the present application, the first transistor T1, the second transistor T2, the third transistor T3, the fourth transistor T4, the fifth transistor T5, the sixth transistor T6, the seventh transistor T7, and the eighth transistor T8 are of the same type to not only avoid the influence of the difference between different types of transistors on the pixel circuit, but also make structure and process of the pixel circuit simpler.

In detail, an anode of the light emitting element DL is electrically connected to a third node C, and a cathode of the light emitting element DL is electrically connected to a second power VSS. The light emitting element DL generates light having a predetermined brightness according to amount of current supplied from the first transistor T1. In the embodiment of the present application, the light emitting element DL may be an organic light-emitting diode including an organic light-emitting layer or may be an inorganic light-emitting element DL formed of an inorganic material.

In detail, a gate of the first transistor T1 (or a driving transistor) is electrically connected to a fourth node Q, a source of the first transistor T1 is electrically connected to a first node A, and a drain of the first transistor T1 is electrically connected to a second node B. The first transistor T1 controls the amount of current flowing from a first power VDD via the light emitting element DL and into the second power VSS according to a voltage of the fourth node Q. A voltage of the first power VDD is set to a higher voltage than a voltage of the second power VSS.

In detail, a gate of the second transistor T2 is electrically connected to a time voltage line RST, a source of the second transistor T2 is electrically connected to a reset power VEH, and a drain of the second transistor T2 is electrically connected to the first node A. When a time voltage signal is supplied through the time voltage line RST, the second transistor T2 is turned on. In detail, the second transistor T2 is turned on by the time voltage signal supplied by the time voltage line RST. At this moment, a voltage of the reset power VEH is supplied to the first node A (namely the source of the first transistor T1).

In detail, a gate of the third transistor T3 is electrically connected to a $i^{th}$ first scan line B(i), a source of the third transistor T3 is electrically connected to the second node B, and a drain of the third transistor T3 is electrically connected to the fourth node Q. When a scan signal (for example, a first scan signal) is supplied through the $i^{th}$ first scan line B(i), the third transistor T3 is turned on. In detail, the third transistor T3 is turned on by the scan signal supplied by the $i^{th}$ first scan line B(i). At this moment, the second node B and the fourth node Q may be electrically connected, that is, the drain and the gate of the first transistor T1 are electrically connected to each other, and the first transistor T1 is electrically connected as a diode configuration.

In detail, a gate of the fourth transistor T4 is electrically connected to the $i-1^{th}$ second scan line A(i−1), a source of the fourth transistor T4 is electrically connected to the first initial power V1, and a drain of the fourth transistor T4 is electrically connected to the second node B. When a scan signal (for example, a second scan signal) is supplied through the $i-1^{th}$ second scan line A(i−1), the fourth transistor T4 is turned on. In detail, the fourth transistor T4 is turned on by the scan signal supplied from the $i-1^{th}$ second scan line A(i−1). At this moment, a voltage of the first initial power V1 is supplied to the second node B (namely the drain of the first transistor T1).

In detail, a gate of the fifth transistor T5 is electrically connected to the third scan line (or the $i^{th}$ second scan line A(i)), a source of the fifth transistor T5 is electrically connected to the data line DA, and a drain of the fifth transistor T5 is electrically connected to the first node A. When a scan signal (for example, a second scan signal) is supplied through the $i^{th}$ second scan line A(i), the fifth transistor T5 is turned on. In detail, the fifth transistor T5 is turned on by the scan signal supplied from the $i^{th}$ second scan line A(i). At this moment, the data line DA is electrically connected to the first node A.

In detail, a gate of the sixth transistor T6 is electrically connected to the third scan line (or the $i^{th}$ second scan line A(i)), and a source of the sixth transistor T6 is electrically connected to the second initial power V2. A drain of the six transistor T6 is electrically connected to the anode of the light emitting element DL. When a scan signal (for example, a second scan signal) is supplied through the $i^{th}$ second scan line A(i), the sixth transistor T6 is turned on. In detail, the sixth transistor T6 is turned on by the scan signal supplied from the $i^{th}$ second scan line A(i). At this moment, the voltage of the second initial power V2 is supplied to the third node C (namely the anode of the light emitting element DL).

In detail, a gate of the seventh transistor T7 is electrically connected to the $i^{th}$ emitting control line EM(i), a source of the seventh transistor T7 is electrically connected to the first power VDD, and a drain of the seventh transistor T7 is electrically connected to the first node A. When an emitting control signal is supplied through the $i^{th}$ emitting control line EM(i), the seventh transistor T7 is turned off, and may be turned on under other conditions. In detail, the seventh transistor T7 is turned off by the emitting control signal supplied from the $i^{th}$ emitting control line EM(i).

In detail, a gate of the eighth transistor T8 is electrically connected to the $i^{th}$ emitting control line EM(i), a source of the seventh transistor T7 is electrically connected to the second node B, and a drain of the eighth transistor T8 is electrically connected to the third node C. When the emitting control signal is supplied through the $i^{th}$ emitting control line EM(i), the eighth transistor T8 is turned off, and may be turned on under other conditions. In detail, the eighth transistor T8 is turned off by the emitting control signal supplied from the $i^{th}$ emitting control line EM(i).

In an embodiment of the present application, the first initial power V1, the second initial power V2, and the reset power VEH generate different voltages. For example, a voltage for initializing the first node A, a voltage for initializing the third node C, and a voltage for initializing the fourth node Q are set to different voltages.

When the voltage of the first initial power V1 to be supplied to the fourth node Q is too low during a low-frequency driving period in which the length of one frame period increases, the variation of the hysteresis of the first transistor T1 in the corresponding frame period may deteriorate. Such hysteresis may cause flicker during low-frequency driving. Therefore, in a display device driven at a low frequency, the voltage of the first initial power V1 may be required to be higher than the voltage of the second power VSS.

During low-frequency driving, when a turn-on bias is applied to the first transistor T1 using a signal that supplied via the data line DA by turn-on operation of the fifth transistor T5 (i.e., when the first transistor T1 is biased on), A serious deviation due to hysteresis due to difference between the gray scale values of adjacent pixel circuits may occur. Therefore, a difference occurs between the shift amounts of the threshold voltages of the driving transistors in adjacent pixel circuits, and therefore, motion blur (namely a ghost phenomenon) caused by such a difference can be perceived.

In order to solve this problem, the pixel circuit and the display device having the pixel circuit according to the embodiment may use the second transistor T2 to periodically apply the reset power VEH as a constant voltage to the source of the first transistor T1. Therefore, the hysteresis deviation due to the gray scale difference between adjacent pixel circuits can be removed, and therefore the image blur due to the hysteresis deviation can be reduced (or eliminated). That is, in response to the time voltage signal provided by the time voltage line RST, the second transistor T2 is turned off during the display scan period of one frame period and turned on during the self scan period of one frame period, so as to reset the first transistor T1 during the self scan period of one frame period. Compared with the prior art, the embodiment of the present application does not need to design an additional set of high-frequency driving scan signals, so that the driving efficiency of the display device can be improved and the power consumption of the display device can be minimized.

Figure 2:
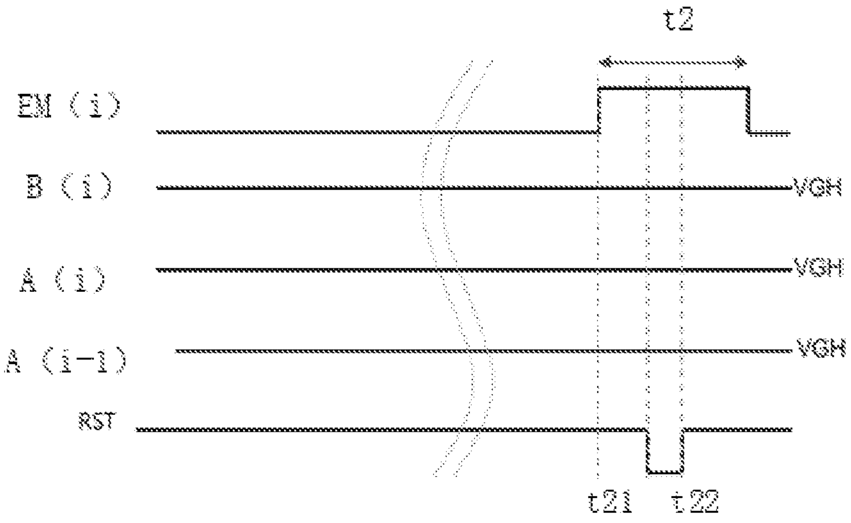
FIG. 2 is driving timing diagram of the pixel circuit shown in FIG. 1 during a display scan period.
Figure 3:
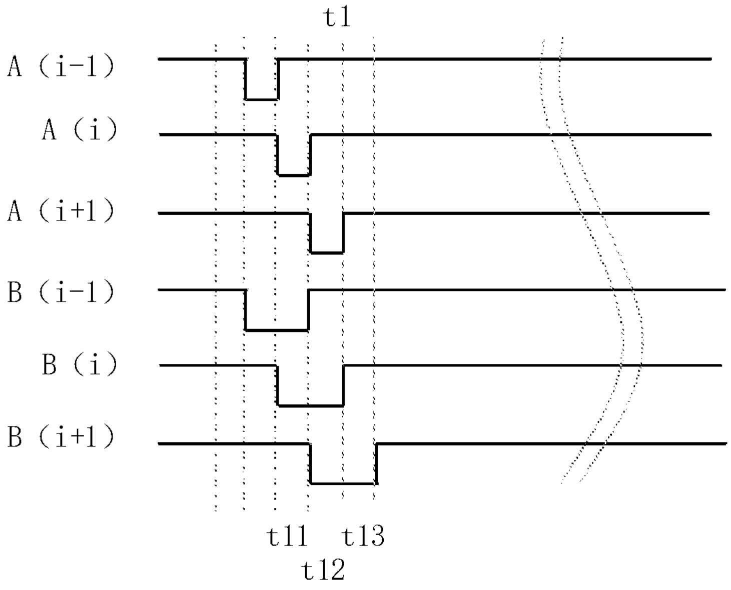
FIG. 3 is driving timing diagram of the pixel circuit shown in FIG. 1 during a self scan period.

Please refer to FIG. 2 and FIG. 3. FIG. 2 is a driving timing diagram of the pixel circuit shown in FIG. 1 during the display scan period. FIG. 3 is a driving timing diagram of the pixel circuit shown in FIG. 1 during a self scan period. Hereinafter, for ease of description, the following description may be made: the $i^{th}$ emitting control line can be taken as the emitting control line, the $i^{th}$ first scan line B(i) can be taken as the first scan line, the $i-1^{th}$ second scan line A(i−1) may be taken as a previous second scan line, and the $i^{th}$ second scan line A(i) may be taken as the second scan line.

In an embodiment of the present application, the first scan signal supplied by the first scan line has a pulse width of 2 horizontal periods (2H). The second scan signal supplied by the second scan line has a pulse width of 1 horizontal period (1H). The first scan signal supplied through the first scan line, the second scan signal supplied through the second scan line, and the time voltage signal supplied through the time voltage line RST are defined as a logic low voltage and the emitting control signal used to turn off the seventh transistor T7 and the eighth transistor T8 is defined as a logic high voltage. However, this is only exemplary, so the pulse width and logic level of the scan signal and the emitting control signal are not limited thereto, and may be changed according to the pixel circuit structure, the type of transistor, etc. within the spirit and scope of the disclosure.

It should be noted that the driving timing of the pixel circuit provided in the embodiment of the present application includes a display scan period t1 and a self scan period t2. The display scan period t1 includes a first display scan period t11, a second display scan period t12, and a third display scan period t13. The self scan period t2 includes a first self scan period t21 and a second self scan period t22.

In detail, in the first display scan period t11, the first scan line supplies a scan signal, the previous second scan line supplies a scan signal, and the third transistor T3 and the fourth transistor T4 are turned on. The voltage of the first initial power V1 is supplied to the fourth node Q (the gate of the first transistor T1) via the third transistor T3 and the fourth transistor T4. Therefore, the gate of the first transistor T1 is initialized in the first display scan period. In the second display scan period t12, the first scan line supplies a scan signal, the second scan line supplies a scan signal, and the third transistor T3, the fifth transistor T5, and the sixth transistor T6 are turned on. When the third transistor T3 is turned on, the first transistor T1 is electrically connected in a diode configuration. When the fifth transistor T5 is turned on, the data line DA is electrically connected to the first node A. Therefore, the writing of data into the first transistor T1 and the compensation of the threshold voltage can be performed together. At the same time, when the sixth transistor T6 is turned on, the voltage of the second initial power V2 is supplied to the anode of the light emitting element DL (namely the third node C). When the voltage of the second initial power V2 is supplied to the anode of the light emitting element DL, the parasitic capacitance Cst of the light emitting element DL may be discharged. When the residual voltage charged in the parasitic capacitor Cst is discharged (eliminated), it is possible to prevent from unexpected small light emission. Therefore, a black performance capability of the pixel circuit can be improved. In the third display scan period t13, the supply of the emitting control signal is stopped, and the seventh transistor T7 and the eighth transistor T8 are turned on. When the seventh transistor T7 and the eighth transistor T8 are turned on, the driving current generated based on the data signal is supplied to the light emitting element DL, and the light emitting element DL emits light with a brightness corresponding to the driving current.

In detail, in the first self scan period t21, the emitting control signal is continued supplied, the seventh transistor T7 and the eighth transistor T8 are turned off, and the pixel circuit enters a blank period. In the second self scan period t22, when the time voltage line RST supplies the time voltage signal, the second transistor T2 is turned on. The voltage of the reset power VEH is supplied to the first node A (namely the source of the first transistor T1) via the second transistor T2. That is, the second transistor T2 is turned off during the display scan period t1 of one frame period, and is turned on during the self scan period t2 of one frame period to reset the first transistor T1 during the self scan period t2 of one frame period. Compared with the prior art, the embodiment of the present application does not need to design an additional set of high-frequency driving scan signals, so that the driving efficiency of the display device can be improved and the power consumption of the display device can be minimized.

It should be noted that one frame period may only include the display scan period t1. One frame period may include a display scan period t1 and at least one self scan period t2. That is, a single frame may include at least one self scan period t2 according to an image frame rate. The image frame rate may be the frequency at which the data signal is actually written to the driving transistor of each pixel circuit. For example, the image frame rate may also be referred to as the scan rate or the screen display frequency and may indicate the frequency of refreshing the displayed image per second.

In particular, in the embodiment of the present application, during the display scan period t1, the scan signal needs to be supplied to the third transistor T3, the fourth transistor T4, the fifth transistor T5, and the sixth transistor T6. During the self scan period t2, the scan signal need not to be supplied to the third transistor T3, the fourth transistor T4, the fifth transistor T5, and the sixth transistor T6.

Figure 4:
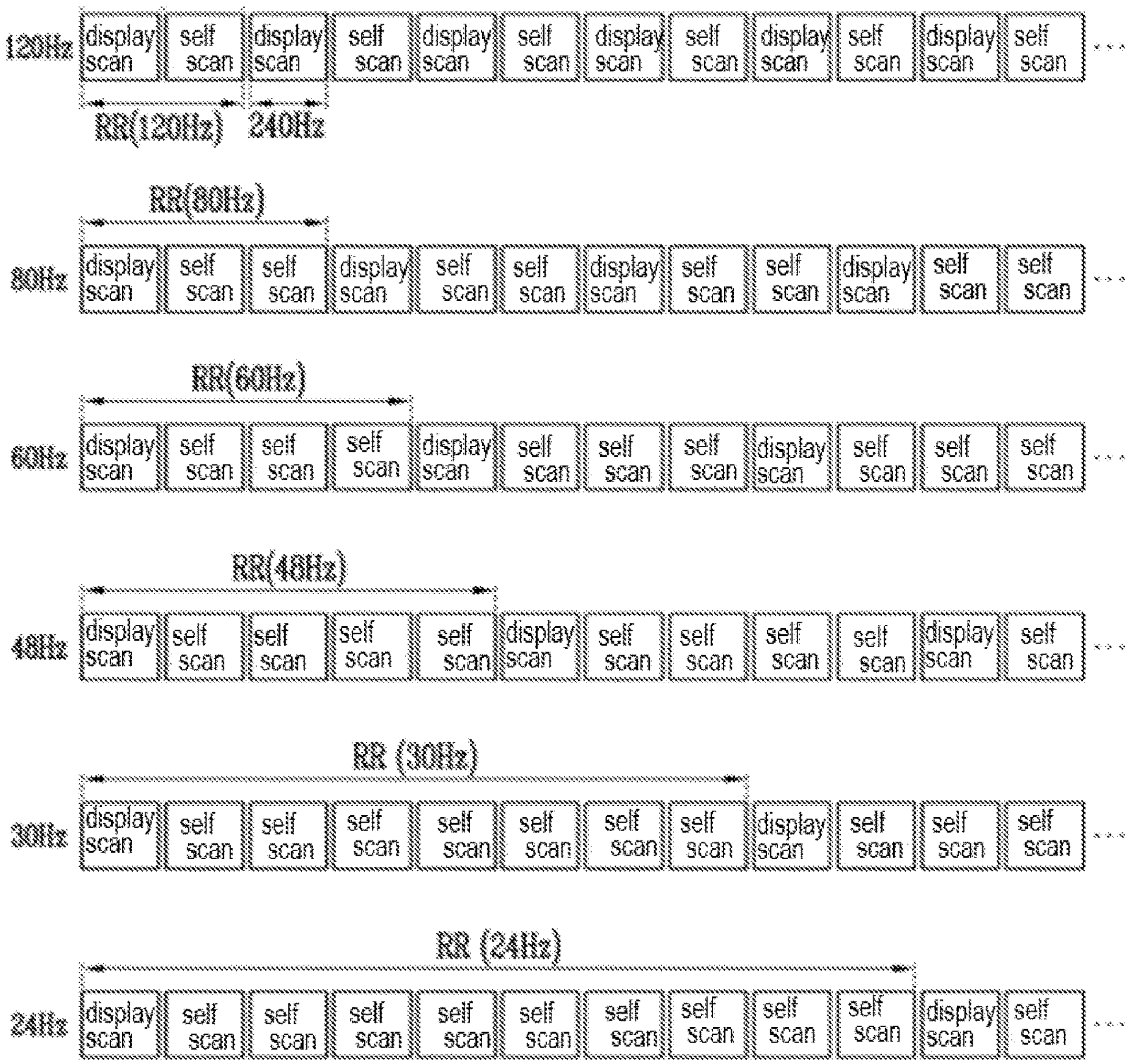
FIG. 4 is a schematic view of a method of driving a display device according to an image frame rate according to an embodiment of the disclosure.

Please refer to FIG. 4, which is a schematic diagram of a method of driving a display device according to an image frame rate according to an embodiment of the present application. As shown in FIG. 4, when the display device is driven at an image frame rate of about 240 Hz, one frame period may include only one display scan period t1. When the display device is driven at an image frame rate of 120 Hz, one frame period may include one display scan period t1 and a self scan period t2. When the display device is driven at an image frame rate of 80 Hz, a frame period may include a display scan period t1 and two consecutive self scan periods t2. When the display device is driven at an image frame rate of about 60 Hz, one frame period can include one display scan period t1 and three consecutive self scan periods t2. When the display device is driven at an image frame rate of 48 Hz, one frame period can include one display scan period t1 and four consecutive self scan periods t2. When the display device is driven at an image frame rate of 30 Hz, one frame period may include one display scan period t1 and seven consecutive self scan period periods t2. When the display device is driven at an image frame rate of 24 Hz, one frame period may include one display scan period t1 and nine consecutive self scan periods t2. As the frame rate decreases, the number of self scan periods t2 increases, and therefore a turn-on bias having a predetermined magnitude may be periodically applied to each first transistor T1 included in the pixel circuit. It can improve the brightness reduction, flicker, or image blur that occurs during low-frequency driving.

In addition, the connection mode and driving timing setting of the third transistor T3 and the fourth transistor T4 in an embodiment of the present application can reduce the leakage path of the potential of the fourth node Q.

Figure 5:
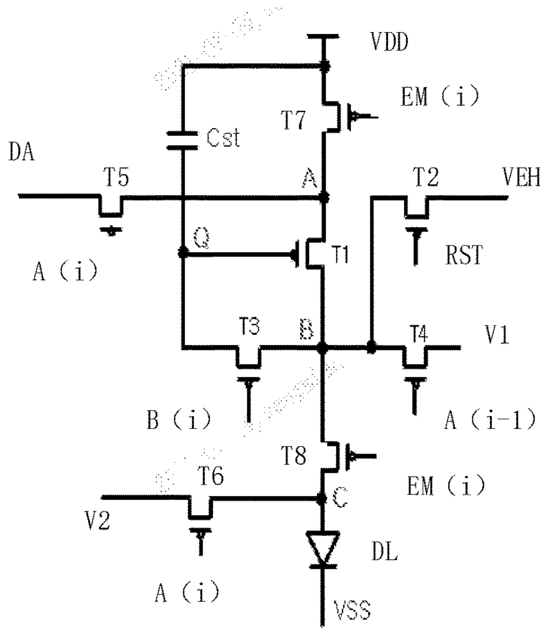
FIG. 5 is a second equivalent circuit diagram of a pixel circuit of an embodiment of the present disclosure.

Please refer to FIG. 5. FIG. 5 is a second equivalent schematic diagram of the pixel circuit provided by an embodiment of the application. As shown in FIGS. 1 and 5, the difference between the pixel circuit shown in FIG. 5 and the pixel circuit shown in FIG. 1 is that the drain of the second transistor T2 in the pixel circuit shown in FIG. 5 is connected to the second node B. The drain of the second transistor T2 in the pixel circuit shown in FIG. 1 is connected to the first node A.

The pixel circuit shown in FIG. 5 connects the drain of the second transistor T2 with the second node B. As the frame rate decreases, the number of the self scan periods increases, so a turn-on bias with a predetermined magnitude can be periodically applied to each first transistor T1 included in the pixel circuit. Therefore, it is possible to improve brightness reduction, flicker, or image blur that occurs during low-frequency driving. In addition, the connection mode and driving timing setting of the third transistor T3 and the fourth transistor T4 in the pixel circuit shown in FIG. 5 can reduce the leakage path of the potential of the fourth node Q.

Figure 6:
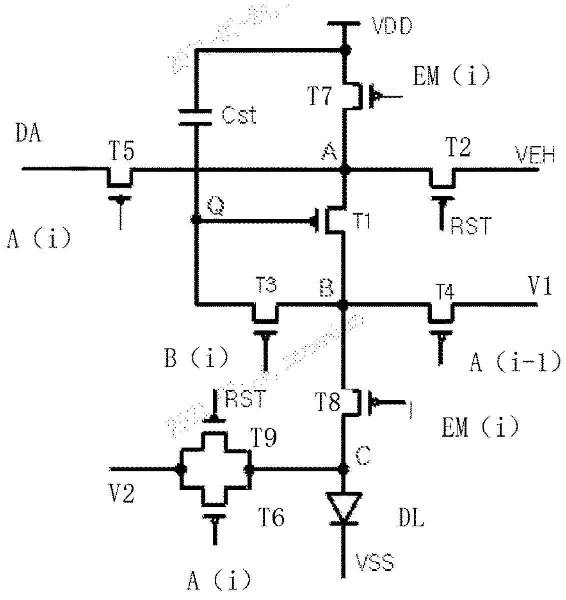
FIG. 6 is a third equivalent circuit diagram of a pixel circuit of an embodiment of the present disclosure.

Please refer to FIG. 6. FIG. 6 is a third equivalent schematic diagram of the pixel circuit provided by an embodiment of the application. As shown in FIGS. 1 and 6, the difference between the pixel circuit shown in FIG. 6 and the pixel circuit shown in FIG. 1 is that the pixel circuit shown in FIG. 6 further includes a ninth transistor T9. A gate of the ninth transistor T9 is electrically connected to the time voltage line RST, a source of the ninth transistor T9 is electrically connected to the second initial power supply V2, and a drain of the ninth transistor T9 is electrically connected to the anode of the light emitting element DL.

The pixel circuit shown in FIG. 6 connects the drain of the second transistor T2 with the first node A. As the frame rate decreases, the number of the self scan periods increases, so a turn-on bias with a predetermined magnitude can be periodically applied to each first transistor T1 included in the pixel circuit. Therefore, it is possible to improve brightness reduction, flicker, or image blur that occurs during low-frequency driving. In addition, the connection mode and driving timing setting of the third transistor T3 and the fourth transistor T4 in the pixel circuit shown in FIG. 5 can reduce the leakage path of the potential of the fourth node Q.

The pixel circuit shown in FIG. 6 can also respond to the time voltage signal provided by the time voltage line RST through the ninth transistor T9, turn off during the display scan period t1 of one frame period, and turn on during the self scan period t2 of one frame period. The anode of the light emitting element DL is reset during the self scan period t2 of one frame period.

Figure 7:
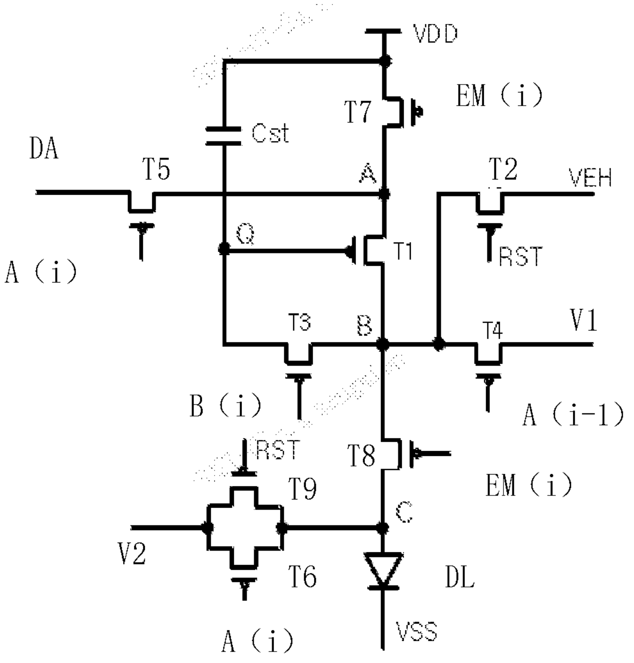
FIG. 7 is a fourth equivalent circuit diagram of a pixel circuit of an embodiment of the present disclosure.

Please refer to FIG. 7. FIG. 7 is a third equivalent schematic diagram of the pixel circuit provided by an embodiment of the application. As shown in FIGS. 1 and 7, the difference between the pixel circuit shown in FIG. 7 and the pixel circuit shown in FIG. 1 is that the drain of the second transistor T2 in the pixel circuit shown in FIG. 7 is connected to the second node B. The drain of the second transistor T2 in the pixel circuit shown in FIG. 1 is connected to the first node A. In addition, the pixel circuit shown in FIG. 7 further includes a ninth transistor T9. The gate of the ninth transistor T9 is electrically connected to the time voltage line RST, the source of the ninth transistor T9 is electrically connected to the second initial power V2, and the drain of the ninth transistor T9 is electrically connected to the anode of the light emitting element DL.

The pixel circuit shown in FIG. 7 connects the drain of the second transistor T2 with the second node B. As the frame rate decreases, the number of the self-scan periods increases, so a turn-on bias with a predetermined magnitude can be periodically applied to each first transistor T1 included in the pixel circuit. Therefore, it is possible to improve brightness reduction, flicker, or image blur that occurs during low-frequency driving. In addition, the connection mode and driving timing setting of the third transistor T3 and the fourth transistor T4 in the pixel circuit shown in FIG. 5 can reduce the leakage path of the potential of the fourth node Q.

The pixel circuit shown in FIG. 7 can also respond to the time voltage signal provided by the time voltage line RST through the ninth transistor T9, turn off during the display scan period t1 of one frame period, and turn on during the self scan period t2 of one frame period. The anode of the light emitting element DL is reset during the self scan period t2 of one frame period.

Figure 8:
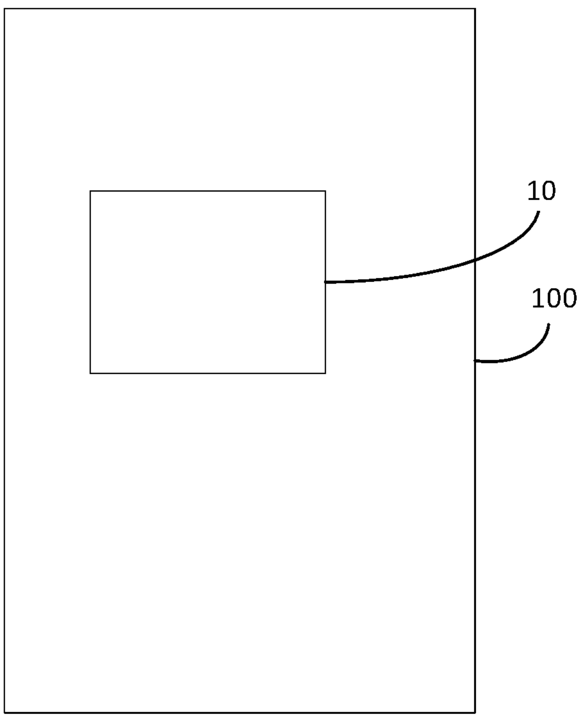
FIG. 8 is a schematic view of a structure of a display device of an embodiment of the present disclosure.

Please refer to FIG. 8, which is a schematic structural diagram of a display device provided by an embodiment of the application. The display device 100 provided by the embodiment of the present application includes a plurality of pixel circuits 10 arranged in an array. Among the pixel circuits 10, the pixel circuits 10 arranged in the $i^{th}$ horizontal row can be specifically referred to the pixel circuits shown above.

In particular, in one embodiment, the pixel circuit 10 arranged in the $i^{th}$ horizontal row includes a first transistor T1, a second transistor T2, a third transistor T3, a fourth transistor T4, a fifth transistor T5, a sixth transistor. T6, a seventh transistor T7, a eighth transistor T8, a capacitor Cst, and a light emitting element DL, wherein the first transistor T1 and the light emitting element DL are connected in series between a first power VDD and a second power VSS. A gate of the second transistor T2 is electrically connected to a time voltage line RST, a source of the second transistor T2 is electrically connected to a reset power VEH, and a drain of the second transistor T2 is electrically connected to a source of the first transistor T1 or a drain of the first transistor T1. A gate of the three transistor T3 is electrically connected to a first scan line, a source of the third transistor T3 is electrically connected to the drain of the first transistor T1, and a drain of the third transistor T3 is electrically connected to the gate of the first transistor T1. A gate of the fourth transistor T4 is electrically connected to a second scan line, a source of the fourth transistor T4 is electrically connected to a first initial power V1, and a drain of the fourth transistor T4 is electrically connected to the drain of the first transistor T1. A gate of the fifth transistor T5 is electrically connected to a third scan line, a source of the fifth transistor T5 is electrically connected to a data line DA, and a drain of the fifth transistor T5 is electrically connected to the source of the first transistor T1. A gate of the sixth transistor T6 is electrically connected to the third scan line, a source of the sixth transistor T6 is electrically connected to a second initial power V2, and a drain of the sixth transistor T6 is electrically connected to an anode of the light emitting element DL. A cathode of the light emitting element DL is electrically connected to the second power VSS. A gate of the seventh transistor T7 is electrically connected to an emitting control line, a source of the seventh transistor T7 is electrically connected to the first power VDD, and a drain of the seventh transistor T7 is electrically connected to the source of the first transistor T1. A gate of the eighth transistor T8 is electrically connected to the emitting control line, a source of the eighth transistor T8 is electrically connected to the drain of the first transistor T1, and a drain of the eighth transistor T8 is electrically connected to the anode of the light emitting element DL. A first end of the capacitor Cst is electrically connected to the first power VDD, and a second end of the capacitor Cst is electrically connected to the gate of the first transistor T1.

Figure 9:
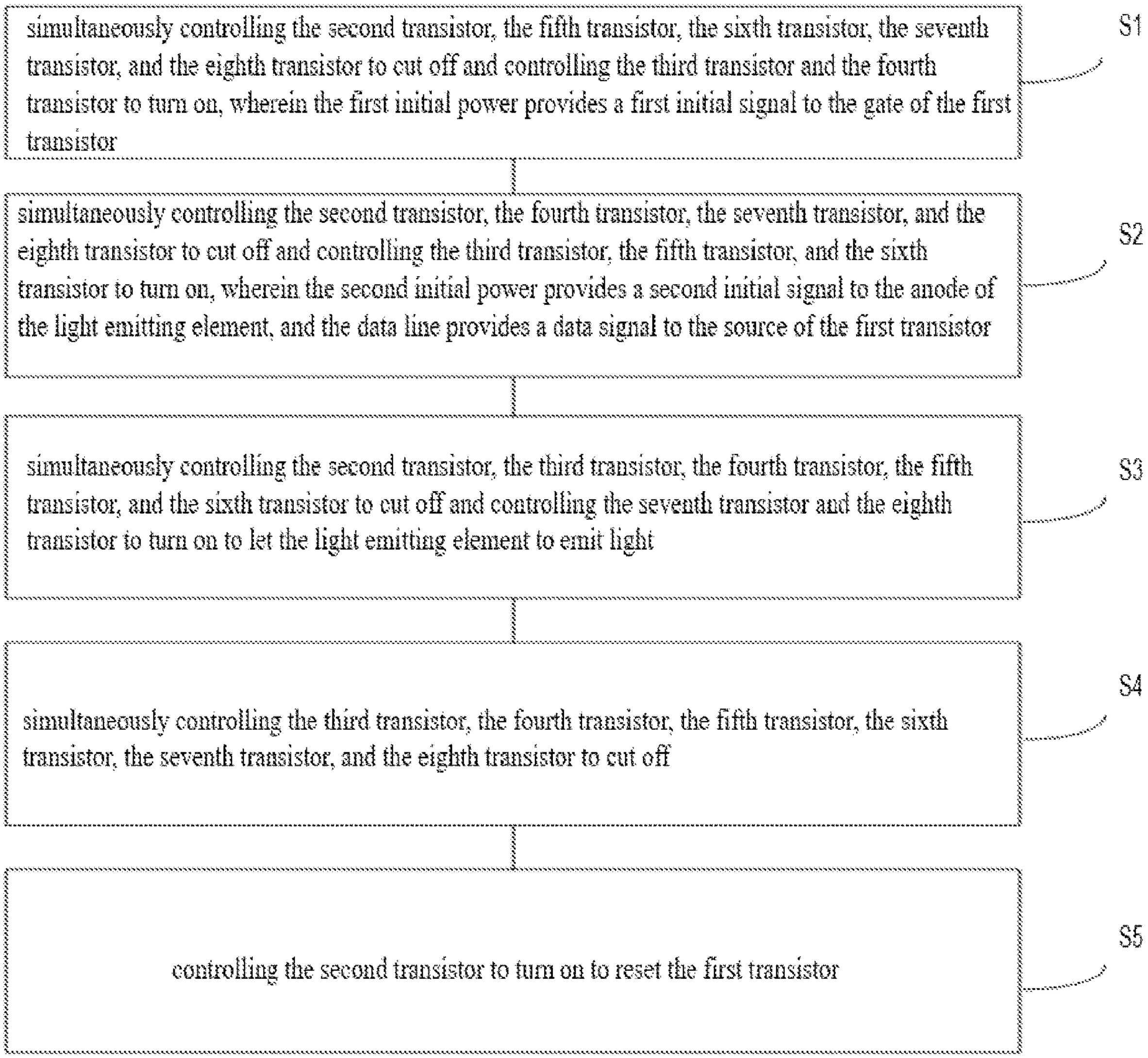
FIG. 9 is a schematic view of a method of driving the display device in FIG. 8.

Please refer to FIG. 9, which is a schematic diagram of a method of driving the display device shown in FIG. 8. As shown in FIG. 9, the driving method of the display device includes:

Step S1: simultaneously controlling the second transistor, the fifth transistor, the sixth transistor, the seventh transistor, and the eighth transistor to cut off and controlling the third transistor and the fourth transistor to turn on, wherein the first initial power provides a first initial signal to the gate of the first transistor;

Step S2: simultaneously controlling the second transistor, the fourth transistor, the seventh transistor, and the eighth transistor to cut off and controlling the third transistor, the fifth transistor, and the sixth transistor to turn on, wherein the second initial power provides a second initial signal to the anode of the light emitting element, and the data line provides a data signal to the source of the first transistor;

Step S3: simultaneously controlling the second transistor, the third transistor, the fourth transistor, the fifth transistor, and the sixth transistor to cut off and controlling the seventh transistor and the eighth transistor to turn on to let the light emitting element to emit light;

Step S4: simultaneously controlling the third transistor, the fourth transistor, the fifth transistor, the sixth transistor, the seventh transistor, and the eighth transistor to cut off; and Step S5: controlling the second transistor to turn on to reset the first transistor.

In the pixel circuit, the display device, and the driving method thereof provided in the present application, in response to the time voltage signal provided by the time voltage line RST, the second transistor T2 is turned off during the display scan period of one frame period and is turned on during the self scan period of one frame period to reset the first transistor T1 during the self scan period of one frame period, so that the pixel circuit can be reset and compensated in the case of low-frequency driving, thereby improving the driving efficiency of the display device and minimizing the power consumption of the display device.

Specific examples are used to illustrate the principles and implementation of the application. The descriptions of the above examples are only used to help understand the methods and core ideas of the application. At the same time, for those skilled in the art, according to the principles of the application, the idea, the specific implementation, and the scope of application may be changed. In summary, the content of this specification should not be construed as a limitation to the present invention.

What is claimed is:

1. A pixel circuit, comprising:

a light emitting element;

a first transistor connected to the light emitting element in series, wherein the first transistor and the light emitting element are disposed between a first power and a second power, and the first transistor is configured to control a driving current pass through the light emitting element base on a voltage of a gate of the first transistor;

a second transistor connected to the first transistor, wherein the second transistor is cutoff in a display scan period of a frame period and turning on in a self scan period of the frame period to reset the first transistor in the self scan period of the frame period based on a time voltage signal provided from a time voltage line, wherein a gate of the second transistor is electrically connected to the time voltage line, a source of the second transistor is electrically connected to a reset power, a drain of the second transistor is electrically connected to a source of the first transistor or a drain of the first transistor;

a third transistor, wherein a gate of the third transistor is electrically connected to a first scan line, a source of the third transistor is electrically connected to the source of the first transistor, and a drain of the third transistor is electrically connected to the gate of the first transistor;

a fourth transistor, wherein a gate of the fourth transistor is electrically connected to a second scan line, a source of the fourth transistor is electrically connected to a first initial power, and a drain of the fourth transistor is electrically connected to the drain of the first transistor;

a fifth transistor, wherein a gate of the fifth transistor is electrically connected to a third scan line, a source of the fifth transistor is electrically connected to a data line, and a drain of the fifth transistor is electrically connected to the source of the first transistor;

a sixth transistor, wherein a gate of the sixth transistor is electrically connected to the third scan line, a source of the sixth transistor is electrically connected to a second initial power, and a drain of the sixth transistor is electrically connected to an anode of the light emitting element, and wherein a cathode of the light emitting element is electrically connected to the second power;

a seventh transistor, wherein a gate of the seventh transistor is electrically connected to an emitting control line, a source of the seventh transistor is electrically connected to the first power, and a drain of the seventh transistor is electrically connected to the source of the first transistor;

an eighth transistor, wherein a gate of the eighth transistor is electrically connected to the emitting control line, a source of the eighth transistor is electrically connected to the drain of the first transistor, and a drain of the eighth transistor is electrically connected to the anode of the light emitting element;

a capacitor, wherein one end of the capacitor is electrically connected to the first power, and another end of the capacitor is electrically to the gate of the first transistor; and a ninth transistor, wherein a gate of the ninth transistor is electrically connected to the time voltage line, a source of the ninth transistor is electrically connected to the second initial power, and a drain of the ninth transistor is electrically connected to the anode of the light emitting element.

2. The pixel circuit according to claim 1, wherein the first scan line, the second scan line, and the third scan line are configured to provide scan signal in the display scan period to turn on transistors correspondingly and configured to provide no scan signal in the self scan period.

3. The pixel circuit according to claim 1, wherein a frequency of a first scan signal provided by the first scan line, a frequency of a second scan signal provided by the second scan line, and a frequency of a third scan signal provided by the third scan line are the same.

4. The pixel circuit according to claim 1, wherein the first transistor, the second transistor, the third transistor, the fourth transistor, the fifth transistor, the sixth transistor, the seventh transistor, the eighth transistor, and the ninth transistor all are low temperature polysilicon transistor.

5. A display device, comprising a pixel circuit, wherein the pixel circuit comprises a first transistor, a second transistor, a third transistor, a fourth transistor, a fifth transistor, a sixth transistor, a seventh transistor, a eighth transistor, a ninth transistor, a capacitor, and a light emitting element, the first transistor is connected to the light emitting element in series, the first transistor and the light emitting element are disposed between a first power and a second power, a gate of the second transistor is electrically connected to a time voltage line, a source of the second transistor is electrically connected to a reset power, a drain of the second transistor is electrically connected to a source of the first transistor or a drain of the first transistor, a gate of the third transistor is electrically connected to a first scan line, a source of the third transistor is electrically connected to the source of the first transistor, a drain of the third transistor is electrically connected to the gate of the first transistor, a gate of the fourth transistor is electrically connected to a second scan line, a source of the fourth transistor is electrically connected to a first initial power, a drain of the fourth transistor is electrically connected to the drain of the first transistor, a gate of the fifth transistor is electrically connected to a third scan line, a source of the fifth transistor is electrically connected to a data line, a drain of the fifth transistor is electrically connected to the source of the first transistor, a gate of the sixth transistor is electrically connected to the third scan line, a source of the sixth transistor is electrically connected to a second initial power, a drain of the sixth transistor is electrically connected to an anode of the light emitting element, a cathode of the light emitting element is electrically connected to the second power, a gate of the seventh transistor is electrically connected to an emitting control line, a source of the seventh transistor is electrically connected to the first power, a drain of the seventh transistor is electrically connected to the source of the first transistor, a gate of the eighth transistor is electrically connected to the emitting control line, a source of the eighth transistor is electrically connected to the drain of the first transistor, a drain of the eighth transistor is electrically connected to the anode of the light emitting element, one end of the capacitor is electrically connected to the first power, and another end of the capacitor is electrically to the gate of the first transistor, a gate of the ninth transistor is electrically connected to the time voltage line, a source of the ninth transistor is electrically connected to the second initial power, and a drain of the ninth transistor is electrically connected to the anode of the light emitting element.

6. The display device according to claim 5, wherein the first scan line, the second scan line, and the third scan line are configured to provide scan signal in a display scan period to turn on transistors correspondingly and configured to provide no scan signal in a self scan period.

7. The display device according to claim 5, wherein a frequency of a first scan signal provided by the first scan line, a frequency of a second scan signal provided by the second scan line, and a frequency of a third scan signal provided by the third scan line are the same.

8. The display device according to claim 5, wherein the first transistor, the second transistor, the third transistor, the fourth transistor, the fifth transistor, the sixth transistor, the seventh transistor, the eighth transistor, and the ninth transistor all are transistors with a same type.

9. The display device according to claim 5, wherein the first transistor, the second transistor, the third transistor, the fourth transistor, the fifth transistor, the sixth transistor, the seventh transistor, the eighth transistor, and the ninth transistor all are low temperature polysilicon transistor.

10. A method of driving a display device, wherein the method of driving the display device is configured to drive the display device of claim 5, and the method comprises:

simultaneously controlling the second transistor, the fifth transistor, the sixth transistor, the seventh transistor, and the eighth transistor to cut off and controlling the third transistor and the fourth transistor to turn on, wherein the first initial power provides a first initial signal to the gate of the first transistor;

simultaneously controlling the second transistor, the fourth transistor, the seventh transistor, and the eighth transistor to cut off and controlling the third transistor, the fifth transistor, and the sixth transistor to turn on, wherein the second initial power provides a second initial signal to the anode of the light emitting element, and the data line provides a data signal to the source of the first transistor;

simultaneously controlling the second transistor, the third transistor, the fourth transistor, the fifth transistor, and the sixth transistor to cut off and controlling the seventh transistor and the eighth transistor to turn on to let the light emitting element to emit light;

simultaneously controlling the third transistor, the fourth transistor, the fifth transistor, the sixth transistor, the seventh transistor, and the eighth transistor to cut off; and controlling the second transistor to turn on to reset the first transistor.

* * * * *